United States Patent
Stork et al.

(10) Patent No.: US 10,853,419 B2
(45) Date of Patent: Dec. 1, 2020

(54) DATABASE WITH TIME-DEPENDENT GRAPH INDEX

(71) Applicant: SAP SE, Walldorf (DE)

(72) Inventors: Alexander Stork, Dudweiler (DE); Anika Pfefferle, Rohrback (DE); Sascha Scherer, Tholey-Hasborn (DE)

(73) Assignee: SAP SE, Walldorf (DE)

( * ) Notice: Subject to any disclaimer, the term of this patent is extended or adjusted under 35 U.S.C. 154(b) by 258 days.

(21) Appl. No.: 15/940,624

(22) Filed: Mar. 29, 2018

(65) Prior Publication Data
US 2019/0303507 A1    Oct. 3, 2019

(51) Int. Cl.
*G06F 16/901* (2019.01)
*G06F 16/2458* (2019.01)
*G06F 16/22* (2019.01)

(52) U.S. Cl.
CPC ......... *G06F 16/9024* (2019.01); *G06F 16/22* (2019.01); *G06F 16/2477* (2019.01)

(58) Field of Classification Search
CPC ............ G06F 16/9027; G06F 16/2477; G06F 16/9024; G06F 16/22
USPC ................. 707/797, 798, 741, 746
See application file for complete search history.

(56) References Cited

U.S. PATENT DOCUMENTS

| | | | | |
|---|---|---|---|---|
| 10,430,438 | B2* | 10/2019 | Kalki | G06F 16/24 |
| 2006/0221860 | A1* | 10/2006 | Manasse | H04L 12/66 370/254 |
| 2009/0043910 | A1* | 2/2009 | Barsness | G06F 16/24532 709/237 |
| 2010/0114818 | A1* | 5/2010 | Lier | G06F 16/20 707/613 |
| 2014/0337373 | A1* | 11/2014 | Morsi | G06F 16/245 707/769 |
| 2017/0139594 | A1* | 5/2017 | Ahn | G06F 3/061 |
| 2017/0272379 | A1* | 9/2017 | McClean | H04L 41/22 |
| 2018/0018375 | A1* | 1/2018 | Brunel | G06F 16/2246 |

* cited by examiner

*Primary Examiner* — Phong H Nguyen
(74) *Attorney, Agent, or Firm* — Jones Day

(57) ABSTRACT

Data is received that characterizes a data structure comprising a plurality of hierarchical nodes in which dependencies amongst a portion of the nodes are time-dependent. Based on the received data, a graph index is generated for a database that specifies, for each node, all corresponding direct and indirect successor nodes and associated validity time windows. Subsequently, the database receives queries that specify, in a single database protocol command, a request for time-dependent hierarchical information of a node. The database then provides results responsive to the queries (if any). Related apparatus, systems, techniques and articles are also described.

20 Claims, 6 Drawing Sheets

DATABASE WITH TIME-DEPENDENT GRAPH INDEX

TECHNICAL FIELD

The subject matter described herein relates to the provision of an index for time-dependent graphs within a database such as a relational database.

BACKGROUND

Database protocols, such as ABAP Open SQL, are not optimal when it comes to handling parent-child relationships such as those provided by graphs or hierarchies. In particular, with such protocols, it is not possible to build powerful hierarchical and recursive queries because appropriate commands are not available. Rather, the next node must be read on a one by one basis, which necessarily results in multiple individual queries. This arrangement causes poor performance (e.g., query response time, processor and/or memory consumption, etc.) for large graphs or hierarchies. If the relations between nodes have time-dependencies it gets more complex and time-consuming. Further, such calculations are mainly performed in memory at runtime by the application server.

SUMMARY

In one aspect, data is received that characterizes a data structure comprising a plurality of hierarchical nodes in which dependencies amongst a portion of the nodes are time-dependent. Based on the received data, a graph index is generated for a database that specifies, for each node, all corresponding direct and indirect successor nodes and associated validity time windows. Subsequently, the database receives queries that specify, in a single database protocol command, a request for time-dependent hierarchical information of a node. The database then provides results responsive to the queries (if any).

The database protocol can be SQL.

The request for the time-dependent hierarchical information of the node can include a request for all successors of the node and/or a request for all predecessors of the node.

The database can take various forms including, for example, an in-memory database or a database that stores data in physical persistence (e.g., magnetic material, etc.).

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the graph index provided herein can speed up query response time and additionally consume fewer resources (e.g., processor, memory, etc.) by avoiding calculations at an application server for operations such as read operations.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
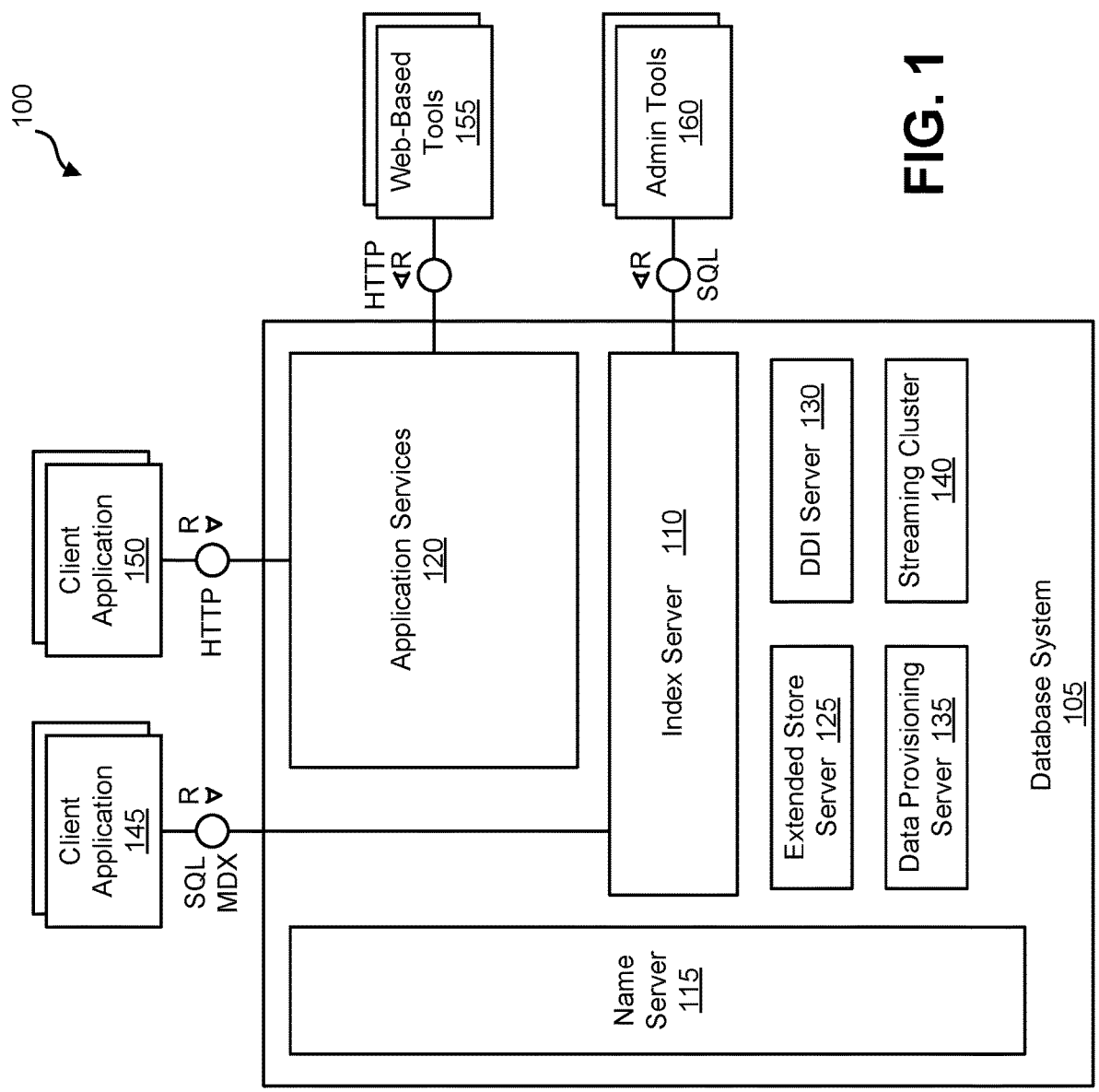
FIG. 1 is a system diagram illustrating a first example database system for use in connection with the current subject matter.
Figure 2:
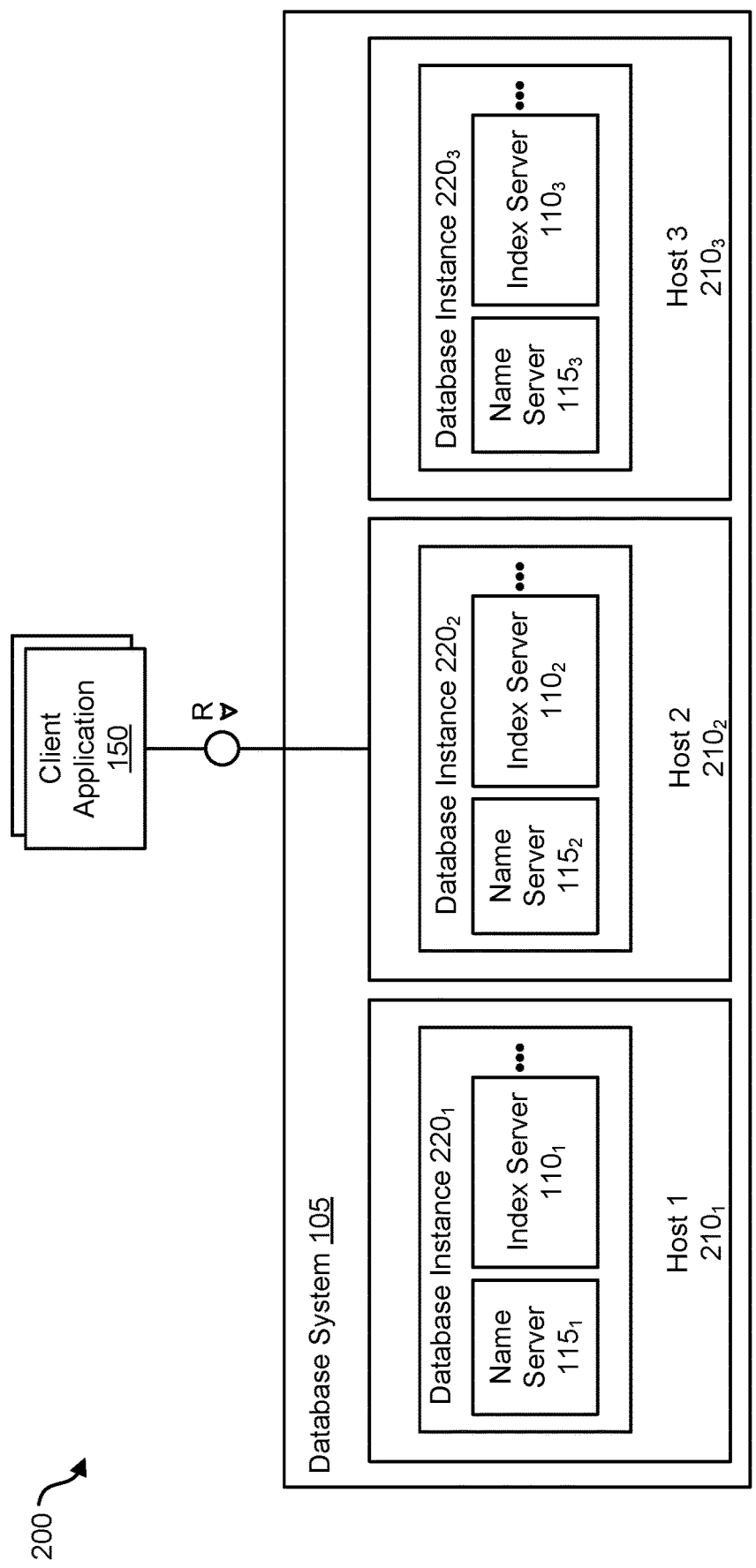
FIG. 2 is a system diagram illustrating a distributed database system having a plurality of database instances.
Figure 3:
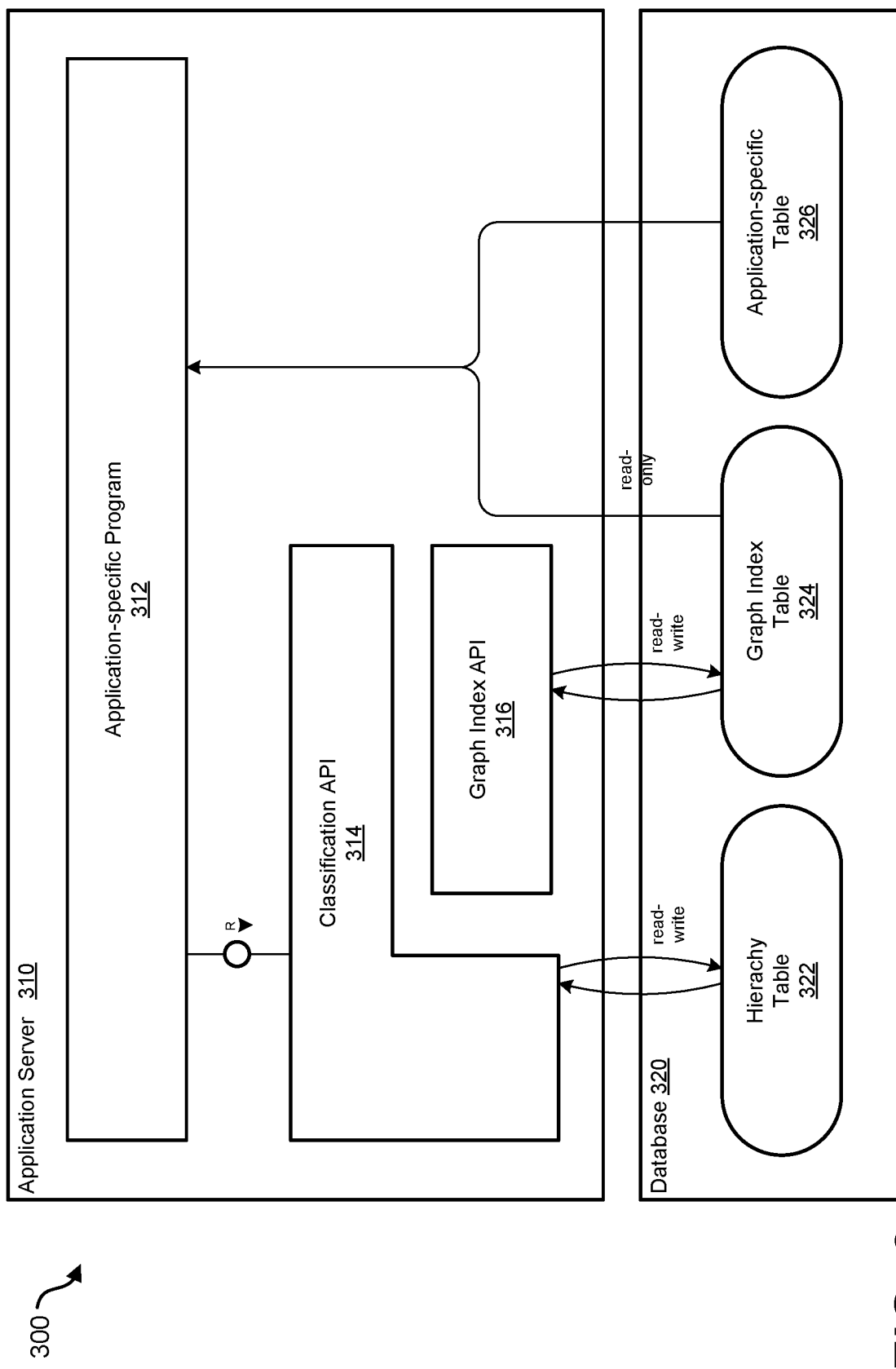
FIG. 3 is a system diagram illustrating a second example database system for use in connection with the current subject matter.

The current subject matter is directed to the provision of an index for time-dependent graphs (sometimes referred to herein as a graph index) for use with a database such as those on illustrated in FIGS. 1-3. The graph index provides fast access to all successors and all predecessors of a node within a time-dependent graph by flattening out the graph information in a new table. Every node can all of its successor nodes assigned thereto including the node itself together with valid-from and valid-to fields. Thus, with the current subject matter, it is possible to get time-dependent hierarchical information such as all successors or all predecessors of a node by a given date in one simple SQL command. The graph index is a redundant information and is only used for speed up query response time and to avoid calculations in application server for read operations.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application services server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application services server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application services server 120 can enable native web applications used by one or more remote clients 150 accessing the database system 105 via a web protocol such as HTTP. The application services server 120 can allow developers to write and run various database applications without the need to run an additional application server. The application services server 120 can also be used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index services server $120_{1-3}$, and so on (other components are omitted to simplify the illustration).

FIG. 3 is a diagram 300 illustrating a sample computing architecture for use with the current subject matter that includes an application server 310 and a database 320. The application server 310 can, for example, be an Advanced Business Application Programming (ABAP) server such as those offered by SAP SE. The application server 310 can execute an application-specific program 312 which can interface directly with the database 320 or, alternatively, via a classification application programming interface (API) 314 and/or a graph index API 316.

The database 320 can comprise or otherwise be, for example, a relational database such as an in-memory database (e.g., SAP HANA platform, etc.). The database server can store data in a hierarchical fashion in a hierarchy table 322. The application server 310 can perform read and write operations in the hierarchy table 322 via the classification API 314. As discussed in further detail below, the database 320 can include a graph index table 324 that provides a graph index for the hierarchy table 322 that specifies, for each node in the hierarchy table 322, corresponding direct and indirect successor nodes and associated validity time windows. The classification API uses the graph index API 316 to maintain the graph index table 324. The hierarchy table 322 contains parent and child information and is the leading source. The graph index table 324 comprises additional records for predecessor and successor information. With this arrangement, it is possible to consume hierarchy information and product information directly by one simple SQL query without reading all node information in application memory. In particular, with the graph index table 324, it is possible to read all successors of a node, all predecessors of a node or all successors and predecessors. Together with the valid form and valid to information (as described below), it is possible to define time-dependent information. The database 320 can further include an application-specific table 326 which can be read by the application-specific program 312. The application-specific program 312 can additionally directly read from the graph index table 312 as opposed to via the graph index API 316.

Figure 4:
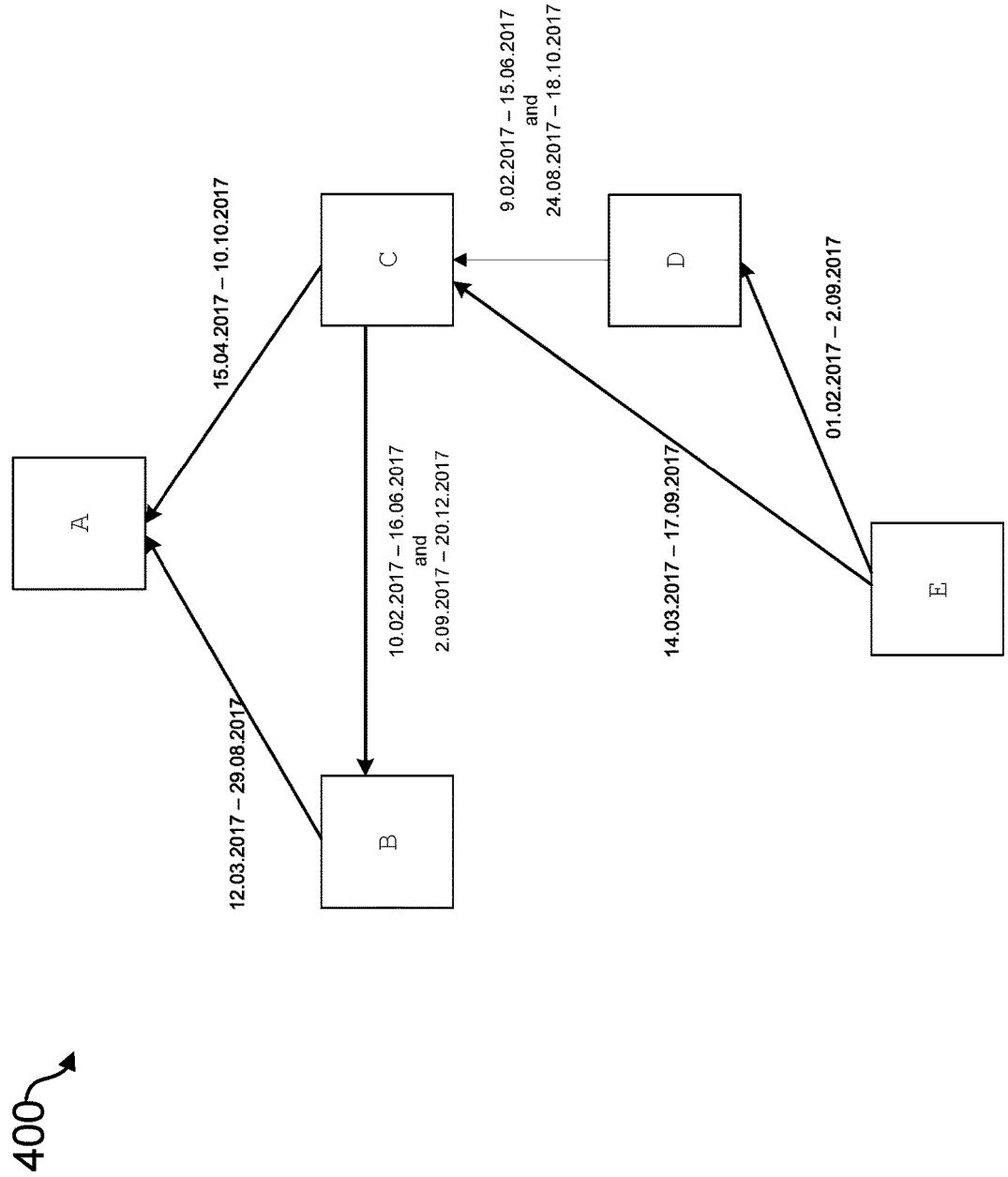
FIG. 4 is a diagram illustrating a hierarchical data structure in which nodes have varying time dependencies.

Table 1 below is a sample hierarchy table that specifies only parent-child node relationships and their time-dependencies. A visual relationship amongst the nodes is also illustrated in the graph 400 of FIG. 4.

TABLE 1

| Parent | Child | ValidFrom | ValidTo |
|---|---|---|---|
| A | B | 2017 Mar. 12 | 2017 Aug. 29 |
| B | C | 2017 Feb. 10 | 2017 Jun. 16 |
| B | C | 2017 Sep. 2 | 2017 Dec. 20 |
| C | E | 2017 Mar. 14 | 2017 Sep. 17 |
| A | C | 2017 Apr. 15 | 2017 Oct. 10 |
| C | D | 2017 Feb. 9 | 2017 Jun. 15 |
| C | D | 2017 Aug. 24 | 2017 Oct. 18 |
| D | E | 2017 Feb. 1 | 2017 Sep. 2 |

The database 320 can include information that characterizes the contents of a graph index as described in further detail below. For example, Table 2 is graph index table definition that can, for example, be utilized by the graph index API 316 and the graph index table 324.

TABLE 2

| Fieldname | Datatype | Description |
|---|---|---|
| Id | Long | Unique id |
| refN | Long | Reference to node |
| refP | Long | Reference to predecessor |
| node | <Any> | Reference to foreign table node |
| pred | <Any> | Reference to foreign table predecessor |
| validFrom | Timestamp | Valid from timestamp |
| validTo | Timestamp | Valid to timestamp |

Following this example, the resulting graph index table is shown in Table 3 below (in which, as an example, 1970-01-01 is an initial date and 9999-01-01 is the infinite date).

TABLE 3

| Id | RefN | RefP | Node | Pred | ValidFrom | ValidTo |
|---|---|---|---|---|---|---|
| 1 | null | null | B | B | 1970 Jan. 1 | 9999 Jan. 1 |
| 2 | null | null | A | A | 1970 Jan. 1 | 9999 Jan. 1 |
| 3 | 3 | 3 | B | A | 2017 Mar. 12 | 2017 Aug. 29 |
| 4 | null | null | C | C | 1970 Jan. 1 | 9999 Jan. 1 |
| 5 | 5 | 5 | C | B | 2017 Feb. 10 | 2017 Jun. 16 |
| 6 | 5 | 3 | C | A | 2017 Mar. 12 | 2017 Jun. 16 |
| 7 | 7 | 7 | C | B | 2017 Sep. 2 | 2017 Dec. 20 |
| 8 | null | null | E | E | 1970 Jan. 1 | 9999 Jan. 1 |
| 9 | 9 | 9 | E | C | 2017 Mar. 14 | 2017 Sep. 17 |
| 10 | 9 | 5 | E | B | 2017 Mar. 14 | 2017 Jun. 16 |
| 11 | 9 | 3 | E | A | 2017 Mar. 14 | 2017 Jun. 16 |
| 12 | 9 | 7 | E | B | 2017 Sep. 2 | 2017 Sep. 17 |
| 13 | 13 | 13 | C | A | 2017 Apr. 15 | 2017 Oct. 10 |
| 14 | 9 | 13 | E | A | 2017 Apr. 15 | 2017 Sep. 17 |
| 15 | null | null | D | D | 1970 Jan. 1 | 9999 Jan. 1 |
| 16 | 16 | 16 | D | C | 2017 Feb. 09 | 2017 Jun. 15 |
| 17 | 16 | 5 | D | B | 2017 Feb. 10 | 2017 Jun. 15 |
| 18 | 16 | 3 | D | A | 2017 Mar. 12 | 2017 Jun. 15 |
| 19 | 16 | 13 | D | A | 2017 Apr. 15 | 2017 Jun. 15 |
| 20 | 20 | 20 | D | C | 2017 Aug. 24 | 2017 Oct. 18 |
| 21 | 20 | 7 | D | B | 2017 Sep. 2 | 2017 Oct. 18 |
| 22 | 20 | 13 | D | A | 2017 Aug. 24 | 2017 Oct. 10 |
| 23 | 23 | 23 | E | D | 2017 Feb. 1 | 2017 Sep. 27 |
| 24 | 23 | 16 | E | C | 2017 Feb. 09 | 2017 Jun. 15 |
| 25 | 23 | 5 | E | B | 2017 Feb. 10 | 2017 Jun. 15 |
| 26 | 23 | 3 | E | A | 2017 Mar. 12 | 2017 Jun. 15 |
| 27 | 23 | 13 | E | A | 2017 Apr. 15 | 2017 Jun. 15 |
| 28 | 23 | 20 | E | C | 2017 Aug. 24 | 2017 Sep. 27 |
| 29 | 23 | 7 | E | B | 2017 Sep. 2 | 2017 Sep. 27 |
| 30 | 23 | 13 | E | A | 2017 Aug. 24 | 2017 Sep. 27 |

The number of records in the graph index table 324 depends on the number of classes and hierarchy depth. The deeper the hierarchy, the more records are created for a node. In practice, the tree is not balanced and thus it is not possible to provide a general formula; however, it is possible to provide a formula for a linear hierarchy with one line of inheritance. Because a deep and flat hierarchy is the worst case for the algorithm the formula can be used to calculate the absolute maximum number of records for creation of a hierarchy if the number of classes is known.

The number of records for one leaf with its ancestors in a linear hierarchy can be calculated by the formula (time dependencies are not considered): number of records for a leaf with its ancestors=$1+2+3+4+5+6\ldots$=depth*(depth+1)/2.

EXAMPLE

| Depth | Calculation | Number of records |
|---|---|---|
| 1 | 1 | 1 |
| 2 | 1 + 2 | 3 |
| 3 | 1 + 2 + 3 | 6 |
| 10 | 1 + 2 + . . . + 10 | 55 |
| 20 | . . . | 210 |
| 50 | . . . | 1275 |
| 100 | . . . | 5050 |
| 500 | . . . | 125250 |
| 1000 | . . . | 500500 |

The example is for a flat and deep hierarchy. The record count grows exponentially for deep hierarchies. The number of records which requires an update depends on how many successors it has and how deep is the hierarchy.

Figure 5:
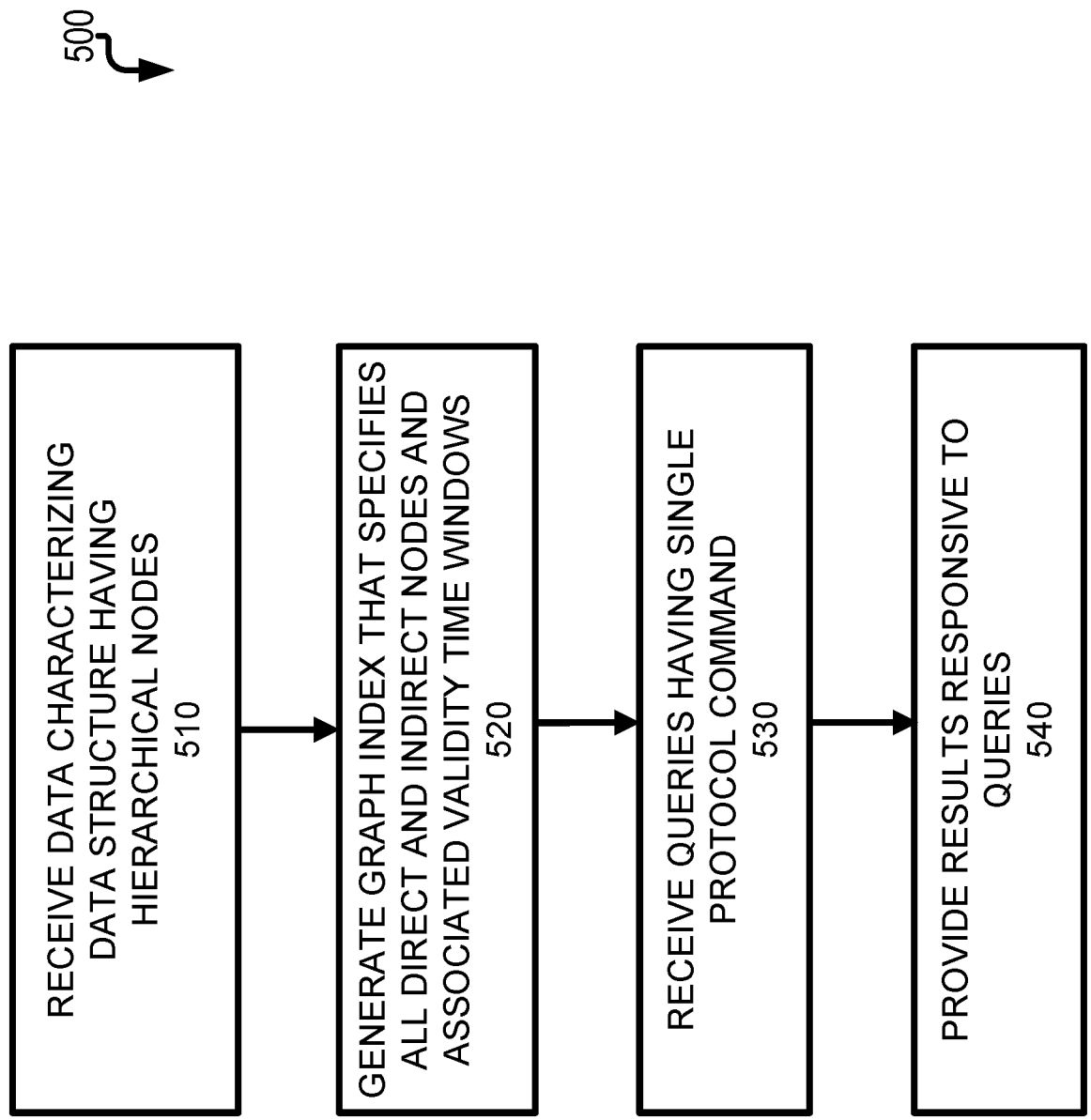
FIG. 5 is a process flow diagram illustrating the generation of a time-dependent graph index for use by a database.

With a simple select statement such as:
SELECT DISTINCT n.node FROM Node n WHERE n.pred=:p_pred and
   n.validFrom<=:p_at and n.validTo>=:p_at
   it is possible to get a list of all successors.
With
SELECT DISTINCT n.pred FROM Node n WHERE n.node=:p_node and
   n.validFrom<=:p_at and n.validTo>=:p_at
   it is possible to get a list of all predecessors.
For example:
   All predecessors of A at 01.05.2017 are A,B,C,D,E
   All predecessors of A at 01.07.2017 are A,B,C,E
   All predecessors of A at 01.09.2017 are A,C,D,E
   All successors of E at 01.03.2017 are B,C,D,E
   All successors of E at 01.04.2017 are A,B,C,D,E
   All successors of E at 15.09.2017 are A,B,C,E
The following pseudocode shows how to add and delete a node from the graph index.
   add(parameters: child, parent, from, to)
   Check if node with the given parameters already exists
     if yes, return
   Check if child-child node already exists in the repository
     if not, create it with infinite validity
   Check if parent-parent node already exists in the repository
     tory
     if not, create it with infinite validity
   Create the new node with
     refN=id of the new node
     refP=id of the new node
     node=child,
     pred=parent,
     validFrom=from,
     validTo=to
   Get all predecessors of parent for interval given by from and to
   Get all successors of child in for interval given by from and to Add the new node to the predecessors of parent and successors of child
   loop at all predecessors of parent
   loop at all successors of child
   if(predecessor is not successor)
     create new node with
       refN=successor.id,
       refP=predecessor.refP,
       node=successor.node,
       pred=predecessor.pred,
validFrom=latest date(predecessor.validFrom, successor.validFrom),
validTo=earliest date(predecessor.validTo, successor.validTo)
delete(parameters: child, parent, from, to)
Check if node with the given parameters exists
   if no, return
Get the node's id
Get all predecessors nodes where refN is the node id
Get all successors nodes where refP is the node id
add the node to the predecessor list
loop at all predecessors
   loop at all successors
     delete node where refN=sucessor.refN and refP=predecessor.refP
delete the node from the database FIG. 5 is a process flow diagram 500 in which, at 510, data characterizing a data structure comprising a plurality of hierarchical nodes in which dependencies amongst a portion of the nodes are time-dependent. Thereafter, at 520, based on the received data, a graph index is generated for a database that specifies, for each node, all corresponding direct and indirect successor nodes and associated validity time windows. Later, at 530, queries are received by the database from a client that each specify, in a single database protocol command, a request for time-dependent hierarchical information of a node. Thereafter, at 540, results responsive to the queries are provided by the database to the client.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 6:
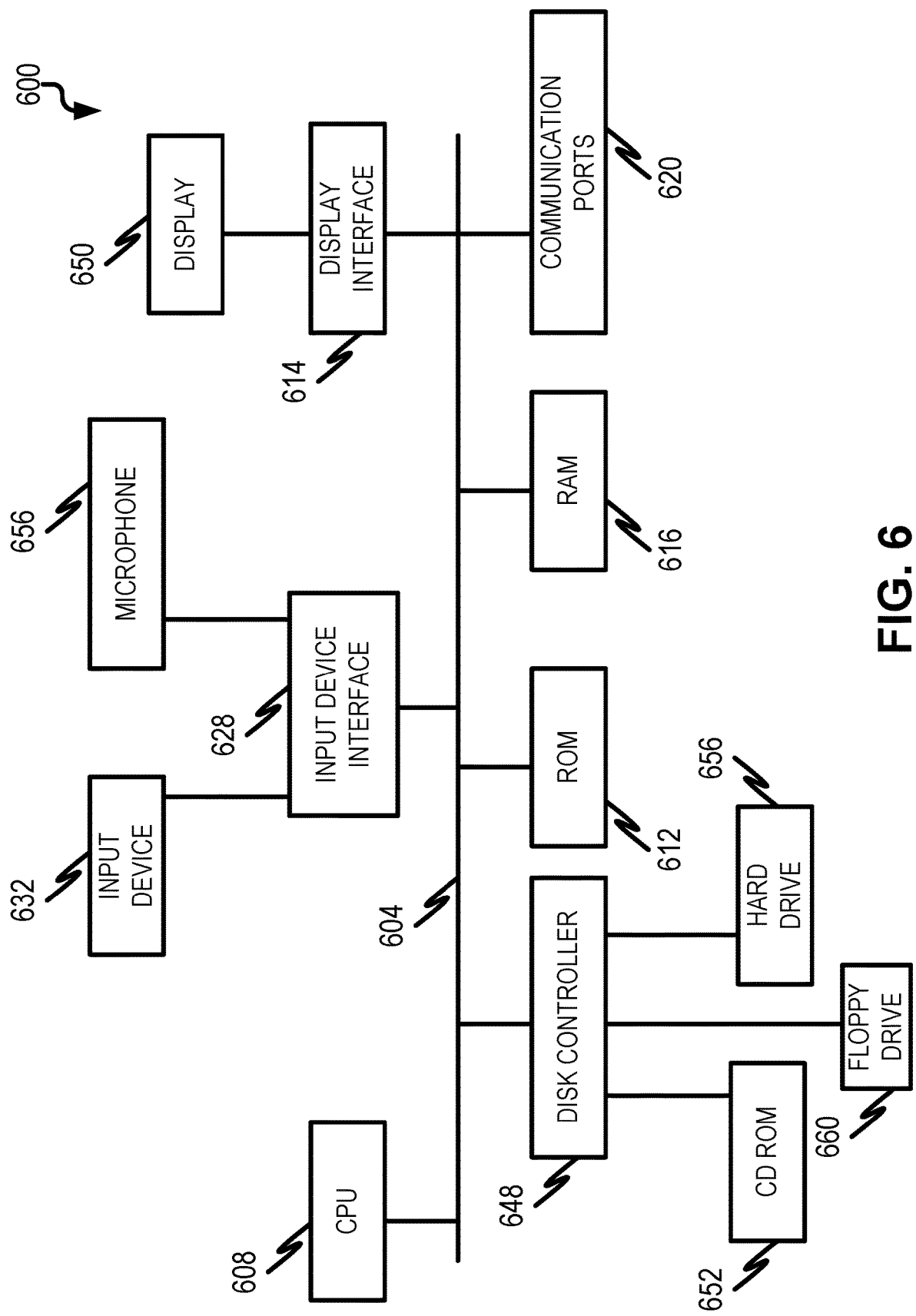
FIG. 6 is a schematic diagram illustrating a computing device for implementing aspects described herein.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 to the user and an input device 632 such as keyboard and/or a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. In the input device 632 and the microphone 636 can be coupled to and convey information via the bus 604 by way of an input device interface 628. Other computing devices, such as dedicated servers, can omit one or more of the display 640 and display interface 624, the input device 632, the microphone 636, and input device interface 628.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving data characterizing a data structure comprising a plurality of hierarchical nodes in which dependencies amongst a portion of the nodes are time-dependent;
   generating, based on the received data, a graph index for a database that specifies, for each node, all corresponding direct and indirect successor nodes and associated validity time windows including a valid from date and a valid to date;
   receiving, by the database from a client, queries each specifying, in a single database protocol command, a request for time-dependent hierarchical information of a node within a requested validity window; and
   providing, by the database to the client using the graph index, results responsive to the queries.

2. The method of claim 1, wherein the database protocol is Structured Query Language (SQL).

3. The method of claim 1, wherein the request for the time-dependent hierarchical information of the node comprises a request for all successors of the node.

4. The method of claim 1, wherein the request for the time-dependent hierarchical information of the node comprises a request for all predecessors of the node.

5. The method of claim 1, wherein the request for the time-dependent hierarchical information of the node comprises a request for all successors and predecessors of the node.

6. The method of claim 1, wherein the database is an in-memory database.

7. The method of claim 1, wherein the database stores data in physical persistence.

8. A system comprising:
   at least one data processor; and
   memory storing instructions which, when executed by the at least one data processor, result in operations comprising:
      receiving data characterizing a data structure comprising a plurality of hierarchical nodes in which dependencies amongst a portion of the nodes are time-dependent;
      generating, based on the received data, a graph index for a database that specifies, for each node, all corresponding direct and indirect successor nodes and associated validity time windows including a valid from date and a valid to date;
      receiving, by the database from a client, queries specifying, in a single database protocol command, a request for time-dependent hierarchical information of a node within a requested validity window; and
      providing, by the database to the client using the graph index, results responsive to the queries.

9. The system of claim 8, wherein the database protocol is Structured Query Language (SQL).

10. The system of claim 8, wherein the request for the time-dependent hierarchical information of the node comprises a request for all successors of the node.

11. The system of claim 8, wherein the request for the time-dependent hierarchical information of the node comprises a request for all predecessors of the node.

12. The system of claim 8, wherein the request for the time-dependent hierarchical information of the node comprises a request for all successors and predecessors of the node.

13. The system of claim 8 further comprising the database and wherein the database is an in-memory database.

14. The system of claim 8 further comprising the database and wherein the database stores data in physical persistence.

15. A non-transitory computer product storing instructions which, when executed by the at least one data processor forming part of at least one computing device, result in operations comprising:
   receiving data characterizing a data structure comprising a plurality of hierarchical nodes in which dependencies amongst a portion of the nodes are time-dependent;
   generating, based on the received data, a graph index for a database that specifies, for each node, all corresponding direct and indirect successor nodes and associated validity time windows including a valid from date and a valid to date within a requested validity window;
   receiving, by the database from a client, queries specifying, in a single database protocol command, a request for time-dependent hierarchical information of a node within a requested validity window; and providing, by the database to the client using the graph index, results responsive to the queries.

16. The computer program product of claim 15, wherein the database protocol is Structured Query Language (SQL).

17. The computer program product of claim 15, wherein the request for the time-dependent hierarchical information of the node comprises a request for all successors of the node.

18. The computer program product of claim 15, wherein the request for the time-dependent hierarchical information of the node comprises a request for all predecessors of the node.

19. The computer program product of claim 15, wherein the request for the time-dependent hierarchical information of the node comprises a request for all successors and predecessors of the node.

20. The computer program product of claim 15, wherein the database is an in-memory database.

* * * * *